(12) United States Patent
Ohashi

(10) Patent No.: US 11,672,051 B2
(45) Date of Patent: Jun. 6, 2023

(54) ELECTRICALLY HEATED SUPPORT, EXHAUST GAS PURIFYING DEVICE AND METHOD FOR PRODUCING ELECTRICALLY HEATED SUPPORT

(71) Applicant: NGK INSULATORS, LTD., Nagoya (JP)

(72) Inventor: Kenichi Ohashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/445,503

(22) Filed: Aug. 20, 2021

(65) Prior Publication Data
US 2022/0095421 A1    Mar. 24, 2022

(30) Foreign Application Priority Data
Sep. 23, 2020 (JP) .............................. JP2020-159053

(51) Int. Cl.
*F01N 3/20* (2006.01)
*H05B 3/26* (2006.01)
*B01D 53/94* (2006.01)
*B01J 20/28* (2006.01)

(52) U.S. Cl.
CPC .............. *H05B 3/26* (2013.01); *B01D 53/94* (2013.01); *B01J 20/28045* (2013.01); *B01D 2255/9155* (2013.01)

(58) Field of Classification Search
CPC ................ H05B 3/26; H05B 2203/016; H05B 2203/022; H05B 2203/024; Y02T 10/12; F01N 2240/16; F01N 3/2026; B01J 35/04

USPC ......................................................... 422/174
See application file for complete search history.

(56) References Cited

U.S. PATENT DOCUMENTS

| | | | | |
|---|---|---|---|---|
| 5,063,029 A | * | 11/1991 | Mizuno | B22F 3/1115 428/116 |
| 5,202,547 A | * | 4/1993 | Abe | F01N 3/2803 219/205 |
| 5,399,841 A | * | 3/1995 | Abe | H05B 3/12 422/174 |
| 5,533,167 A | * | 7/1996 | Kondo | H05B 3/12 422/174 |

(Continued)

FOREIGN PATENT DOCUMENTS

JP    H09-103684 A    4/1997

*Primary Examiner* — Tom P Duong
(74) *Attorney, Agent, or Firm* — Burr Patent Law, PLLC

(57) ABSTRACT

An electrically heated support according to the present invention includes: a pillar shaped honeycomb structure, the honeycomb structure including an outer peripheral wall and a partition wall, the partition wall defining a plurality of cells, each of the cells penetrating from one end face to other end face to form a flow path; and a pair of electrode terminals provided on a surface of the outer peripheral wall. In a cross section of the honeycomb structure, the honeycomb structure includes: a plurality of first slits arranged, the first slits being configured to define an energizing path; and a least one second slit located in the energizing path, the second slit extending in a different direction from that of the first slits. A length of the energizing path from one electrode terminal to the other electrode terminal is longer than a diameter of the honeycomb structure.

12 Claims, 16 Drawing Sheets

(56) References Cited

U.S. PATENT DOCUMENTS

| | | | | |
|---|---|---|---|---|
| 5,651,088 | A | * | 7/1997 | Abe ........................ F01N 3/281 422/174 |
| 5,680,503 | A | * | 10/1997 | Abe ...................... F01N 3/2828 422/174 |
| 5,852,285 | A | | 12/1998 | Kato et al. |
| 6,942,712 | B2 | * | 9/2005 | Hamanaka ............. B01D 39/20 55/529 |
| 8,679,413 | B2 | * | 3/2014 | Ishihara ................... H05B 3/42 422/174 |
| 9,707,515 | B2 | * | 7/2017 | Mase ................ B01D 53/8678 |
| 2003/0202917 | A1 | * | 10/2003 | Ashida .................. F01N 3/0835 422/177 |
| 2012/0076699 | A1 | * | 3/2012 | Ishihara ............... B01J 19/2485 422/174 |
| 2015/0030510 | A1 | * | 1/2015 | Mase ................... F01N 3/2026 422/180 |
| 2015/0260066 | A1 | * | 9/2015 | Hosoi ................ B01D 46/2476 422/174 |

* cited by examiner

ELECTRICALLY HEATED SUPPORT, EXHAUST GAS PURIFYING DEVICE AND METHOD FOR PRODUCING ELECTRICALLY HEATED SUPPORT

FIELD OF THE INVENTION

The present invention relates to an electrically heated support, an exhaust gas purifying device, and a method for producing an electrically heated support.

BACKGROUND OF THE INVENTION

For example, as shown in Patent Literature 1 as described below, an electrically heated catalyst (EHC) is known. In the EHC, a honeycomb structure is heated by passing an electric current through a pair of electrode terminals provided on an outer peripheral wall surface of the honeycomb structure. In such an electrically heated catalyst, the honeycomb structure is provided with a plurality of slits in order to define an energizing path for an electric current flowing through the honeycomb structure.

CITATION LIST

Patent Literature

[Patent Literature 1] Japanese Patent Application Publication No. H09-103684 A

SUMMARY OF THE INVENTION

Even if the honeycomb structures are provided with slits having the same shape in the conventional structure as described above, electrical resistance between the electrode terminals may vary due to factors such as a variation in volume resistance of a base material. For example, when a constant voltage is applied between the electrode terminals, the variation in the electrical resistance between the electrode terminals may change an input power so that a designed output is not obtained, causing problems such as insufficient heating. Further, there is a risk that the electric resistance is lower than a specified value, resulting in a higher current value.

The present invention has been made to solve the above problems. An object of the present invention is to provide an electrically heated support, an exhaust gas purifying device and a method for producing an electrically heated support, which can suppress a variation in electrical resistance between electrode terminals to obtain a designed output more reliably.

An electrically heated support according to the present invention comprises: a pillar shaped honeycomb structure, the honeycomb structure comprising an outer peripheral wall and a partition wall disposed inside the outer peripheral wall, the partition wall defining a plurality of cells, each of the cells penetrating from one end face to other end face to form a flow path; and a pair of electrode terminals provided on a surface of the outer peripheral wall, wherein, in a cross section of the honeycomb structure perpendicular to a cell extending direction, the honeycomb structure comprises: a plurality of first slits arranged apart from each other, the first slits being configured to define an energizing path between the outer peripheral wall and each of the first slits and between the first slits; and at least one second slit located in the energizing path, the second slit extending in a different direction from that of the first slits, and wherein a length of the energizing path from one electrode terminal to the other electrode terminal is longer than a diameter of the honeycomb structure.

An exhaust gas purifying device according to the present invention comprises: the electrically heated support as described above; and a metal case for housing the electrically heated support.

A method for producing an electrically heated support according to the present invention relates to a method for producing an electrically heated support comprising: a pillar shaped honeycomb structure, the honeycomb structure comprising an outer peripheral wall and a partition wall disposed inside the outer peripheral wall, the partition wall defining a plurality of cells, each of the cells penetrating from one end face to other end face to form a flow path; and a pair of electrode terminals provided on a surface of the outer peripheral wall, wherein, in a cross section of the honeycomb structure perpendicular to a cell extending direction, the honeycomb structure comprises a plurality of first slits arranged apart from each other, the first slits being configured to define an energizing path between the outer peripheral wall and each of the first slits and between the first slits, wherein the method comprises the steps of:
preparing an electrically heated support before processing, which has the first slits;
energizing the pair of electrode terminals and measuring electrical resistance of the energizing path;
comparing the measured value of the electrical resistance with a target value of the electrical resistance, and, based on a difference between the measured value and the target value, providing the electrically heated support before processing with at least one second slit located in the energizing path.

According to an electrically heated support, an exhaust gas purifying device, and a method for producing an electrically heated support of the present invention, a variation in electrical resistance between electrode terminals can be suppressed and a designed output can be more reliably obtained, because the honeycomb structure has at least one second slit in addition to a plurality of first slits configured to define an energizing path.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

<Regarding Electrically Heated Support>

Figure 1:
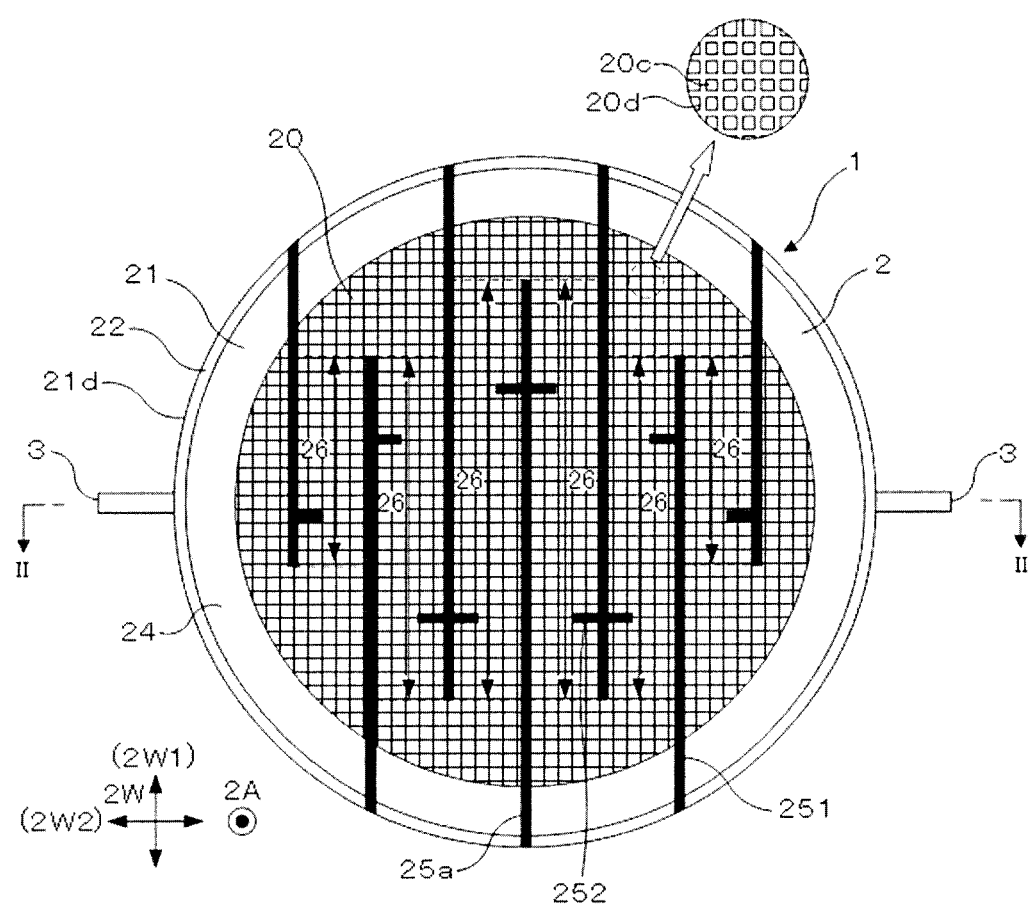
FIG. 1 is a front view showing an electrically heated support according to an embodiment of the present invention.
Figure 2:
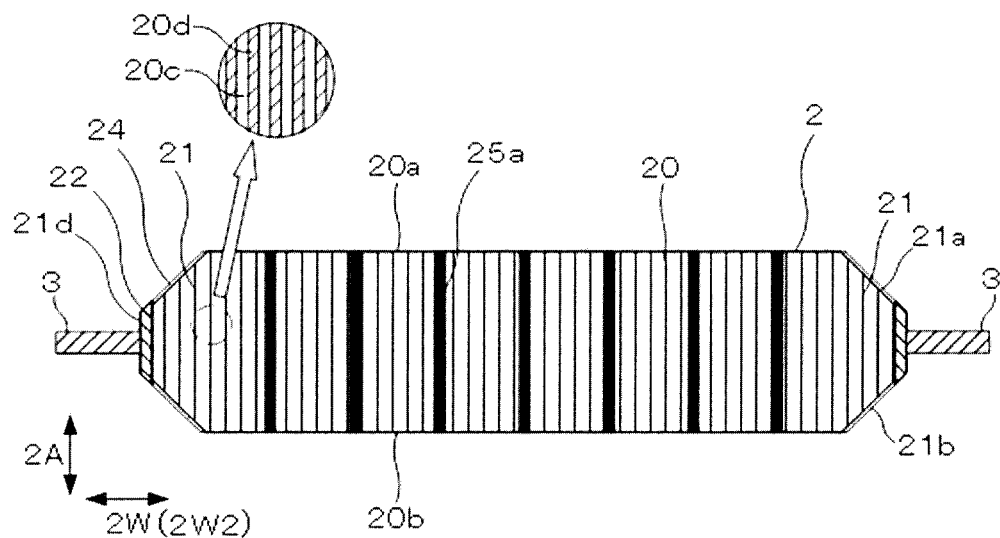
FIG. 2 is a cross-sectional view of the electrically heated support taken along the line II-II in FIG. 1.

FIG. 1 is a front view showing an electrically heated support 1 according to an embodiment of the present invention, and FIG. 2 is a cross-sectional view of the electrically heated support 1 taken along the line II-II in FIG. 1. As shown in FIGS. 1 and 2, the electrically heated support 1 according to the present embodiment includes a honeycomb structure 2 and a pair of electrode terminals 3.

The honeycomb structure 2 is a pillar shaped member made of ceramics. Examples of the ceramic material include oxide-based ceramics such as alumina, mullite, zirconia and cordierite, and non-oxide ceramics such as silicon carbide, silicon nitride and aluminum nitride. Among them, ceramics containing at least one of SiC and Si as a main component are preferable. A ceramic composed of Si-impregnated SiC is more preferable.

The honeycomb structure 2 according the present embodiment has conductivity. The electrical resistivity is not particularly limited as long as the honeycomb structure 2 can be energized to generate heat by Joule heat. The electrical resistivity is preferably from 0.0005 to 200 Ωcm, and more preferably from 0.001 to 100 Ωcm. As used herein, the electrical resistivity of the honeycomb structure 2 is a value measured at 25° C. by the four-terminal method.

An outer shape of the honeycomb structure 2 is not particularly limited as long as it is a pillar shape, and the honeycomb structure 2 can have a pillar shaped with oval end faces, and a pillar shape with polygonal (quadrangular, pentagonal, hexagonal, heptagonal, octagonal, etc.) end faces, and the like. It is understood that the pillar shape is a three-dimensional shape having a thickness in an extending direction of cells 20c (an axial direction 2A of the honeycomb structure 2). An axial length of the honeycomb structure 2 in the axial direction 2A may be shorter than a width direction length of the honeycomb structure 2 in a width direction 2W.

The honeycomb structure 2 of the present embodiment has a central portion 20, an outer peripheral portion 21, and an outer peripheral wall 22.

The central portion 20 is provided at the center of the honeycomb structure 2 in the width direction 2W of the honeycomb structure 2. As shown in FIG. 1, when the end faces of the honeycomb structure 2 are circular, the width direction 2W is synonymous with a radial direction. The central portion 20 has a partition wall 20d for defining a plurality of cells 20c that penetrate from one end face 20a to the other end surface 20b of the central portion 20 to form flow paths. A fluid that has flowed into the cells 20c from one end face 20a can pass through the flow paths and/or the partition wall 20d and flow out from the other end face 20b. The fluid can be, for example, an exhaust gas of a motor vehicle or the like.

A cell shape in the cross section perpendicular to the extending direction of the cells 20c may preferably be a quadrangle, a hexagon, an octagon, or a combination thereof, although not particularly limited thereto. Among them, the quadrangle and the hexagon are preferable. Such a shape of each cell 20c can allow a pressure loss to be reduced when an exhaust gas is passed through the honeycomb structure 2, resulting in improved purification performance of the catalyst. The quadrangle is particularly preferable in view of easy achievement of both structural strength and heating uniformity.

Each partition wall 20d preferably has a porosity of from 0 to 60%, and more preferably from 0 to 50%, and even more preferably from 0 to 40%. The porosity of 60% or less can ensure the strength of the partition wall 20d. The porosity is a value measured by a mercury porosimeter. When the porosity is 20% or less, the porosity may be calculated by binarizing void portions and partition wall portions from an SEM image of the cross section of the partition wall 20d, rather than the mercury porosity meter.

Each partition wall 20d forming each cell 20c preferably has a thickness of from 0.05 to 0.31 mm, and more preferably from 0.07 to 0.25 mm, and even more preferably from 0.09 to 0.2 mm. The thickness of each partition wall 20d of 0.05 mm or more can allow a decrease in the strength of the honeycomb structure 2 to be suppressed. The thickness of each partition wall 20d of 0.31 mm or less can allow an increase in pressure loss to be suppressed as exhaust gas flows when the honeycomb structure 2 is used as a catalyst support to support a catalyst. As used herein, the thickness of each partition wall 20d is defined as a length of a portion of line segments connecting centers of gravity of the adjacent cells 20c, which portion passes through the partition wall 20d, in the cross section perpendicular to the extending direction of the cells 20c.

The honeycomb structure 2 preferably has a cell density of from $150 \times 10^3$ to $1400 \times 10^3$ cells/m$^2$, and preferably from $300 \times 10^3$ to $1300 \times 10^3$ cells/m$^2$, and more preferably from $400 \times 10^3$ to $1200 \times 10^3$ cells/m$^2$, in the cross section perpendicular to the flow path direction of the cells 20c. The cell density in such a range can allow purification performance of the catalyst to be improved while reducing the pressure loss when the exhaust gas flows. The cell density of $150 \times 10^3$ cells/m$^2$ or more can ensure a sufficient catalyst-supporting area. The cell density of $1400 \times 10^3$ cells/m$^2$ or less can prevent a pressure loss when the exhaust gas flows from being excessively increased, when the honeycomb structure 2 is used as a catalyst support to support a catalyst. The cell density is a value obtained by dividing the number of cells by an area of the end face of the central portion 20.

By supporting a catalyst on the honeycomb structure 2, the electrically heated support 1 can be used as a catalyst body. A fluid such as an exhaust gas from a motor vehicle can flow through the flow paths of the cells 20c. Examples of the catalyst include noble metal-based catalysts and catalysts other than those. Illustrative examples of the noble metal catalysts include three-way catalysts and oxidation catalysts having a noble metal such as platinum (Pt), palladium (Pd), and rhodium (Rh) supported on surfaces of alumina pores, and containing a co-catalyst such as ceria and zirconia; or lean NOx trap catalysts (LNT catalysts) containing an alkaline earth metal and platinum as storage components for nitrogen oxides (NOx). Examples of catalysts that do not use noble metals include NOx selective reduction catalysts (SCR catalysts) containing copper-substituted or iron-substituted zeolites, and the like. Further, two or more types of catalysts selected from the group consisting of those catalysts may be used. A method of supporting the catalyst is also not particularly limited, and it can be carried out according to the conventional method of supporting the catalyst on the honeycomb structure.

The outer peripheral portion 21 is provided on the outer side in the width direction of the central portion 20. The outer peripheral portion 21 of the present embodiment is provided so as to surround the central portion 20 over the entire circumferential direction of the central portion 20.

The outer peripheral wall 22 is provided so as to surround the outer peripheral portion 21 over the entire circumferential direction of the central portion 20. The partition wall 20d that define the cells 20c are arranged inside the outer peripheral wall 22. The provision of the outer peripheral wall 22 on the honeycomb structure 2 is useful in terms of ensuring the structural strength of the honeycomb structure 2 and preventing the fluid flowing through the cells 20c from leaking from the outer peripheral wall 22. Specifically, the outer peripheral wall 22 preferably has a thickness of 0.1 mm or more, and more preferably 0.15 mm or more, and even more preferably 0.2 mm or more. However, if the outer peripheral wall 22 is too thick, the strength will become too high, so that a strength balance with the partition wall 20d is lost, and thermal shock resistance is decreased. Therefore, the thickness of the outer peripheral wall 22 is preferably 1.0 mm or less, and more preferably 0.7 mm or less, and even more preferably 0.5 mm or less. As used herein, the thickness of the outer peripheral wall 22 is defined as a thickness of the outer peripheral wall at a measured position in a direction of a normal line with respect to a tangent line when the portion of the outer peripheral wall 22 at which the thickness is to be measured is observed in the cross section perpendicular to the extending direction of the cells.

The outer peripheral portion 21 of the present embodiment has tapered outer shapes from the central portion 20 toward the outer peripheral surfaces 21d of the outer peripheral portion 21. In other words, the length of the outer peripheral portion 21 is gradually shortened in the axial direction from the central portion 20 toward each outer peripheral surface 21d of the outer peripheral portion 21. End faces 21a, 21b of the outer peripheral portion 21 of the present embodiment are tapered faces that are inclined and extended in the width direction 2W of the honeycomb structure 2. The end faces 21a, 21b of the outer peripheral portion 21 are surfaces each connecting an outer edge of the central portion 20 to the outer peripheral surface 21d at both ends of the honeycomb structure 2 in the axial direction 2A. The outer peripheral portion 21 may be omitted, and in this case, the central portion 20 having the cells c defined by the partition wall 20d expands.

The outer peripheral portion 21 of the present embodiment has a symmetrical shape with respect to a plane extending in the width direction 2W of the honeycomb structure 2 at the center position of the honeycomb structure 2 in the axial direction 2A. Inclination angles and extension widths of the respective tapered faces forming the end faces 21a, 21b are equal to each other.

The interior of the outer peripheral portion 21 according to the present embodiment is provided with a plurality of cells 20c penetrating from one end face 21a to the other end surface 21b of the outer peripheral portion 21. The cells 20c provided inside the outer peripheral portion 21 have the same structures as those of the cells 20c provided inside the central portion 20. However, the outer peripheral portion 21 may have a solid structure having no cell 20c therein.

In the present embodiment, openings of the cells 20c are closed by a filling material 24 on the end faces 21a, 21b of the outer peripheral portion 21. In other words, the end faces 21a, 21b of the outer peripheral portion 21 are formed into smooth surfaces by the filling material 24. The smooth surface as used herein means a surface having reduced surface irregularities as compared with the case where the openings of the cells 20c are exposed. As will be described later, the end faces 21a, 21b of the outer peripheral portion 21 form gripping end faces for gripping the honeycomb structure 2. Since the openings of the cells 20c are closed by the filling material 24 on the end faces 21a, 21b of the outer peripheral portion 21, chipping of a metal case 6 or a mat 7 (see FIG. 8) as described later or the end faces 21a, 21b due to contact with the end faces 21a, 21b can be suppressed. However, the filling material 24 may be omitted and the openings of the cells 20c may be opened on the end faces 21a, 21b of the outer peripheral portion 21.

The electrode terminals 3 are provided on the surface of the outer peripheral wall 22. Further, the electrode terminals 3 are provided on the outer peripheral surface 21d of the outer peripheral portion 21 so as to be spaced apart from each other in the circumferential direction of the honeycomb structure 2. The pair of electrode terminals 3 according to the present embodiment are arranged so as to face each other in the width direction 2W of the honeycomb structure 2 across the central axis of the honeycomb structure 2 in the cross section perpendicular to the extending direction of the cells 20c. It may be understood that the pair of electrode terminals 3 are arranged at an angular interval of 180° in the circumferential direction of the honeycomb structure 2. In the present embodiment, the pair of electrode terminals 3 are arranged so as to face each other in a second direction 2W2 where first slits 251 as described later are separated from each other.

Each electrode terminal 3 according to the present embodiment is a pillar shaped member erected on each outer peripheral surface 21d. A band-shaped or tile-shaped electrode layer may be provided between each electrode terminal 3 and each outer peripheral surface 21d. The outer shape of each electrode terminal 3 is not particularly limited as long as it is a pillar shape. For example, the outer shape may be a pillar shape with circular end faces (cylindrical shape), a pillar shape with oval end faces, or a pillar shape with polygonal (quadrangular, pentagonal, hexagonal, heptagonal, octagonal, etc.) end faces.

Each electrode terminal 3 preferably has a diameter of from 5 to 25 mm, and more preferably from 8 to 20 mm, and even more preferably from 10 to 15 mm. The diameter of each electrode terminal 3 of 5 mm or more can ensure current resistant performance. The diameter of each electrode terminal 3 of 25 mm or less can ensure good bondability.

Each electrode terminal 3 preferably has a length of from 6 to 30 mm, and more preferably from 8 to 25 mm, and even more preferably from 10 to 20 mm. The length of each electrode terminal 3 of 6 mm or more can lead to easy connection of each electrode terminal 3 to an external electrode. The length of each electrode terminal 3 of 30 mm or less can prevent the outer diameter of the honeycomb structure 2 from becoming excessive.

When a voltage is applied to the electrode terminals 3, the honeycomb structure 2 can be heated by Joule heat. Therefore, the honeycomb structure 2 can be suitably used as a heater. The applied voltage is preferably from 12 to 900 V, and more preferably from 48 to 600 V, but the applied voltage may be changed as appropriate.

In the cross section perpendicular to the extending direction of the cells 20c, the honeycomb structure 2 has a plurality of first slits 251 and at least one second slit 252. Hereinafter, the "cross section perpendicular to the extending direction of the cells 20c" may be referred to as the "cross section as described above".

The first slits 251 are spaced apart from each other in the cross section as described above, and are configured to define an energizing path between the outer peripheral wall 22 and each first slit 251 and between each other. The first slits 251 are configured to obstruct the flow of electric current, and the electric current from one electrode terminal 3 passes through the honeycomb structure 2 while bypassing the first slit 251 and is directed toward the other electrode terminal 3. The path through which the electric current flows between the electrode terminals 3 is the energizing path. A length of the energizing path from one electrode terminal 3 to the other electrode terminal 3 is longer than a diameter of the honeycomb structure 2 (the shortest distance between the electrode terminals 3).

Each of the first slits 251 may have any shape and arrangement. The first slits 251 according to the present embodiment each linearly extends in a first direction 2W1 and are arranged apart from each other in the second direction 2W2 orthogonal to the first direction 2W1 in the cross section as described above. That is, a plurality of linear first slits 251 are arranged in parallel with each other. The first and second directions 2W1, 2W2 are two directions orthogonal to each other, which are included in the width direction 2W of the honeycomb structure 2. In the present embodiment, the first slits 251 are arranged at equal intervals in the second direction 2W2. However, the intervals of the first slits 251 may be different from each other.

The pair of first slits 251 adjacent to each other in the second direction 2W2 are arranged so as to overlap with each other as viewed from the second direction 2W2. In other words, one tip of the pair of first slits 251 adjacent to each other in the second direction 2W2 is located closer to the other base end side than the other tip. The base end refers to one end of the first slit 251 on the outer peripheral wall 22 side, and the tip refers to the other end of the first slit 251. The tip of each first slit 251 according to the present embodiment is located in the central portion 20. However, the tip of at least a part of the first slits 251 may extend beyond the central portion 20 and reach the outer peripheral portion 21.

At least a part of the first slits 251 extends from the outer peripheral wall 22. In other words, the outer peripheral wall 22 is discontinuous in the circumferential direction of the honeycomb structure 2 by the first slits 251. In this embodiment, all of the first slits 251 extend from the outer peripheral wall 22. In the present embodiment, the first slit 251 extending from the outer peripheral wall 22 on one end side of the honeycomb structure 2 in the first direction 2W1 and the first slit 251 extending from the outer peripheral wall 22 on the other end side are alternately arranged in the second direction 2W2. At least a part of the first slits 251 may not extend from the outer peripheral wall 22 (it may be provided apart from the outer peripheral wall 22).

Here, the energizing path defined by the first slits 251 includes a plurality of partial paths 26. Each partial path 26 is sandwiched between a pair of first slits 251 adjacent to each other in the second direction 2W2, and extends in the first direction 2W1 from one end to the other end of the pair of first slits 251. In the interior of the energizing path of this embodiment, at least two partial paths 26 are arranged in series with each other. In this embodiment, all of the partial paths 26 (six partial paths 26) are arranged in series with each other in the energizing path.

The second slit 252 is located in the energizing path in the cross section as described above. The second slit 252 is configured to obstruct the flow of electric current, and the second slit 252 is provided in addition to the first slits 251 to increase electric resistance in the entire energizing path and around the second slit 252. The second slit 252 is provided to adjust the electrical resistance of the energizing path. In the present embodiment, the second slit 252 extends in a direction different from that of each first slit 251. The second slit 252 is shorter than each first slit 251 and extends in the second direction 2W2. Further, the second slit 252 may intersect with each first slit 251. The second slit 252 may be inclined with respect to the second direction 2W2, or may be provided apart from the first slits 251.

The second slit 252 according to the present embodiment is provided in the partial paths 26. However, the second slit 252 may be provided at a portion of the energizing path between the first slit 251 and the outer peripheral wall 22. In this embodiment, at least one second slit 252 is provided in all the partial paths 26. However, the second slit 252 may not be provided in at least one partial path 26.

When the partial paths 26 are arranged in series as in the present embodiment, the central portion of the honeycomb structure 2 tends to concentratedly generate heat. On the other hand, the second slit 252 according to the present embodiment can increase the electric resistance around the second slit 252 and increase an amount of heat generated around the second slit 252. That is, the adjusting of the electric resistance with the second slit 252 can lead to more uniform heat generation of the honeycomb structure 2. The providing of a larger number of second slits 252 in the peripheral portion than in the central portion of the honeycomb structure 2 can more reliably equalize the heat generation of the honeycomb structure 2. It is understood that the central portion of the honeycomb structure 2 is a region around an area center of gravity of the honeycomb structure 2, which has a shape similar to the outer shape of the region provided with the cells 20c through which the fluid passes (the central portion 20 according to the present embodiment), and which has an area of ¼ of the region provided with the cells 20c. Further, it is understood that the peripheral portion is the outside of the central portion.

Further, depending on use modes of the honeycomb structure 2, it may be desired that the central portion of the honeycomb structure 2 is concentratedly heated. In such a case, a larger number of second slits 252 may be provided in the central portion than in the peripheral portion of the honeycomb structure 2. In other words, the heat generation distribution of the honeycomb structure 2 may be adjusted by the distribution of the second slits 252.

At least one of the first and second slits 251, 252 is filled with the filling material 25a. In the present embodiment, both the first and second slits 251, 252 are filled with the filling material 25a. More particularly, all of the first and second slits 251, 252 are filled with the filling material 25a without any gap. The filling of the first and second slits 251, 252 with the filling material 25a can improve the strength of the honeycomb structure 2. Further, it can suppress the flow of the fluid to the outer peripheral wall 22 side through the first slits 251 extending from the outer peripheral wall 22, thereby reducing deterioration of the electrode terminals 3 and the like. The filling material 25a may be filled only in a part of the first and second slits 251, 252, and the filling material 25a may not be filled in one or both of the first and second slits 251, 252.

Figure 3:
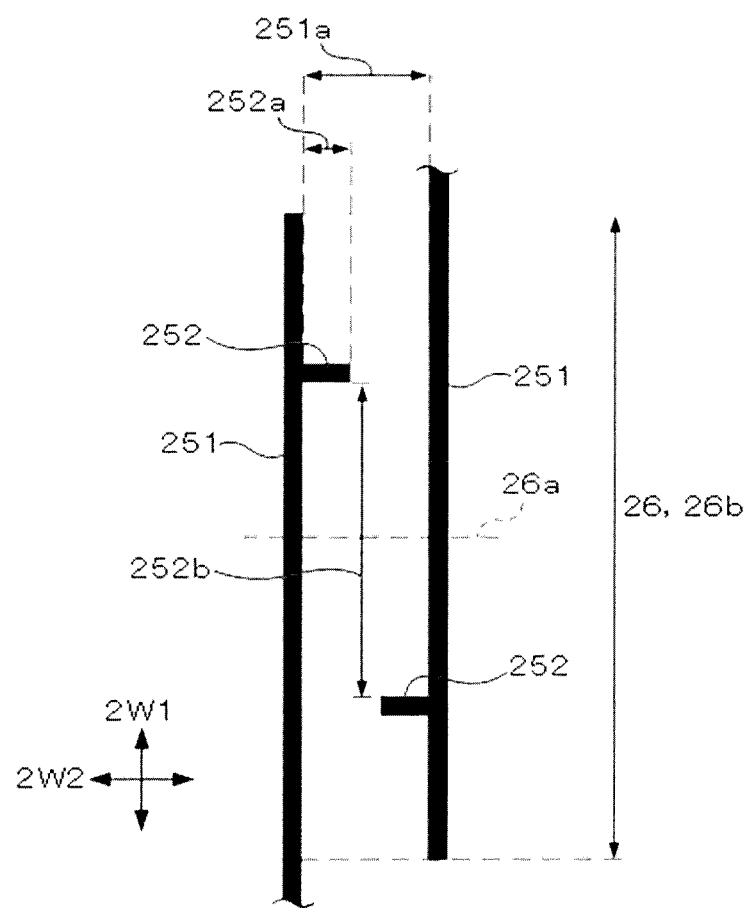
FIG. 3 is an enlarged explanatory view showing one of partial paths in FIG. 1.

Now, FIG. 3 is an enlarged explanatory view showing one of the partial paths 26 in FIG. 1. FIG. 3 shows a pair of first slits 251 sandwiching the partial path 26 and two second slits 252 provided to that partial path 26.

As shown in FIG. 3, the second slit 252 has a predetermined extending width 252a in the second direction 2W2. A longer extending width 252a of the second slit 252 increases an amount of increase in electrical resistance due to the second slit 252. The pair of first slits 251 across the partial path 26 provided with the second slit 252 has a separation distance 251a in the second direction 2W2. The extending width 252a of the second slit 252 is preferably 10% or more and 90% or less of the separation distance 251a of the first slit 251. As will be described in detail later, when the extending width 252a of the second slit 252 is 10% or more of the separation distance 251a of the first slit 251, the electric resistance due to the second slit 252 tends to increase, which is preferable. On the other hand, when the extending width 252a of the second slit 252 is 90% or less of the separation distance 251a of the first slit 251, the strength and/or purification efficiency of the honeycomb structure 2 is improved, and the periphery of that second slit 252 forms a heat spot to increase a thermal stress partially, so that a risk of cracking is suppressed. Further, when the extending width 252a of the second slit 252 filled with the filling material 25a is 90% or less of the separation distance 251a of the first slit 251, an increase in pressure loss can be suppressed. In order to obtain those advantages more reliably, the extending width 252a of the second slit 252 is more preferably 30% or more and 60% or less of the separation distance 251a of the pair of first slits 251.

The second slit 252 in the partial path 26 in the first direction 2W1 is preferably located at a position within 30% of the extending width 26b of the partial path 26 in the first direction 2W1 from the central position 26a of the partial path 26 in the first direction 2W1. That is, the second slit 252 is preferably positioned in a central region of the partial path 26 (a region centered on the central region 26a of the partial path 26, which has a width of 60% of the extending width 26b of the partial path 26 in the first direction 2W1). As will be described in detail later, when the second slit 252 is located at the position within 30% of the extending width 26b from the central position 26a, the adjustment of the electric resistance by the second slit 252 can be stabilized. When one second slit 252 is provided in the partial path 26, that second slit 252 may be arranged at the center position 26a of the partial path 26.

As shown in FIG. 3, when a plurality of second slits 252 are provided in one partial path 26 so as to be separated from each other in the first direction 2W1, the separation distance 252b between the plurality of second slits 252 is preferably 1.25 times or more the separation distance 251a of the pair of first slits 251 across the one partial path 26 in the second direction 2W2. As will be described in detail later, the separation distance 252b between the second slits 252 of 1.25 times or more the separation distance 251a between the first slits 251 can stabilize the adjustment of the electric resistance by the second slits 252. Further, in order to further stabilize the adjustment of the electric resistance by the second slits 252, it is more preferable that the separation distance 252b between the second slits 252 is twice or more the separation distance 251a between the first slits 251.

The number of the second slits 252 provided in one partial path 26 may be determined depending on the extending width 26b of the partial path 26 in the first direction 2W1. For example, when the extending width 26b of the partial path 26 in the first direction 2W1 exceeds a predetermined width, a plurality of second slits 252 may be provided in that partial path 26. The extending width 252a of the second slit 252 may be shorter in the place where a plurality of second slits 252 are provided in one partial path 26 than in the place where one second slit 252 is provided in one partial path 26. This is because an amount of increase in the electrical resistance of the partial path 26 can be ensured as a whole by the plurality of second slits 252. The providing of the plurality of short second slits 252 can allow the strength to be improved and the electric resistance to be uniform while ensuring the amount of increase in the electric resistance.

Figure 4:
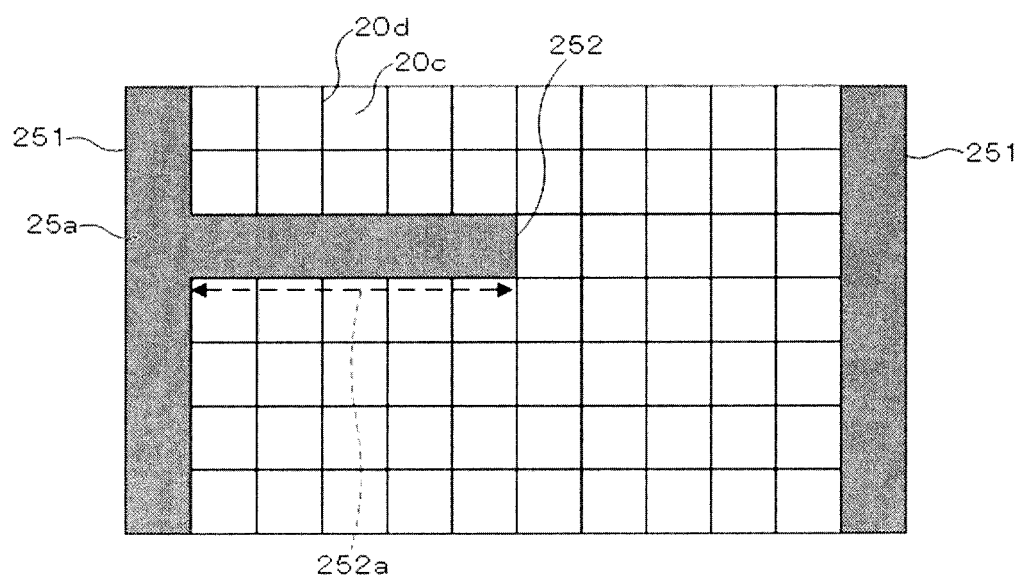
FIG. 4 is an explanatory view showing a first aspect of first and second slits in FIG. 3.

Next, FIG. 4 is an explanatory view showing a first aspect of the first and second slits 251, 252 in FIG. 3. FIG. 4 shows an embodiment where each cell 20c is quadrangular. As described above, the cells 20c are defined by the partition wall 20d. In the cross section as described above, the electric current flows along the partition wall 20d. The first and second slits 251, 252 can be formed by missing (notching) the partition wall 20d so as to connect the adjacent cells 20c. Although FIG. 4 shows that the first and second slits 251, 252 are formed by connecting a single raw of the cells 20c to each other, a larger number of rows of the cells 20c may be connected. The extending width 252a of the second slit 252 can be understood as a distance along the partition wall 20d. As shown in FIG. 4, when each cell 20c is quadrangular, the extending width 252a of the second slit 252 can be measured as a distance along a straight line.

Figure 5:
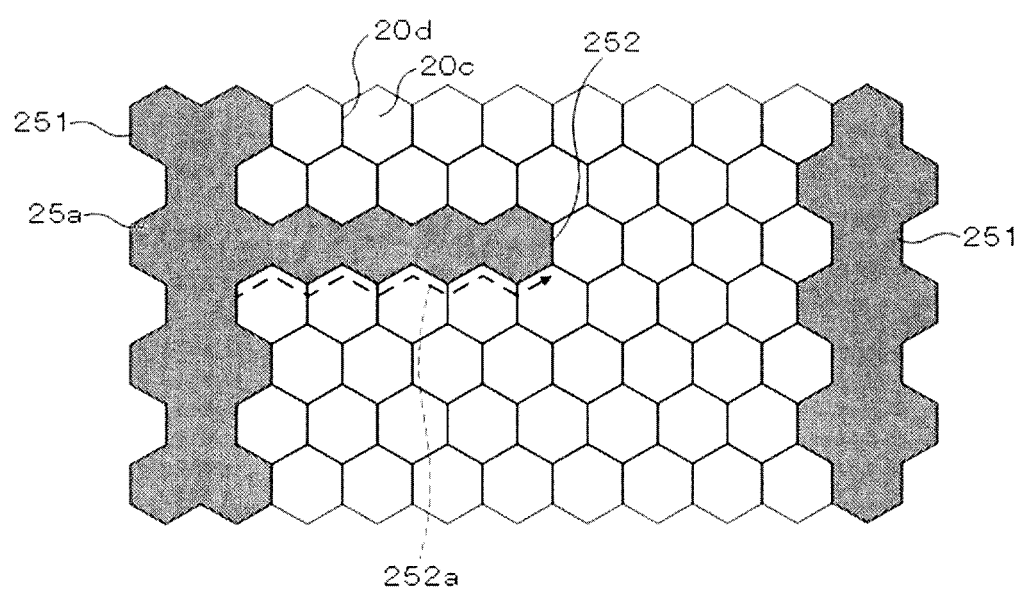
FIG. 5 is an explanatory view showing a second aspect of first and second slits in FIG. 3.
Figure 6:
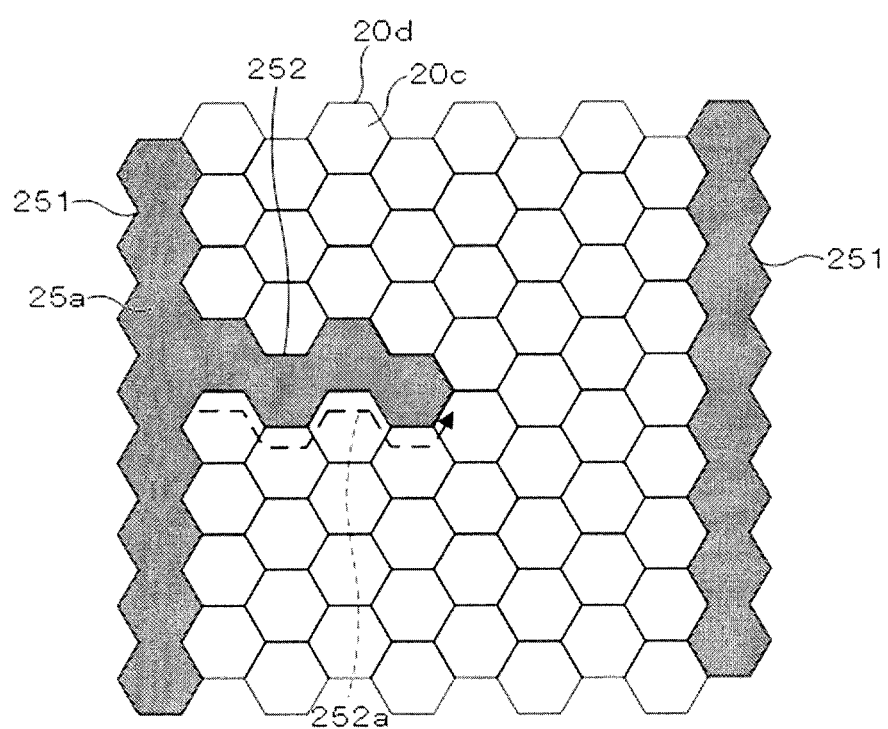
FIG. 6 is an explanatory view showing a third aspect of first and second slits in FIG. 3.
Figure 7:
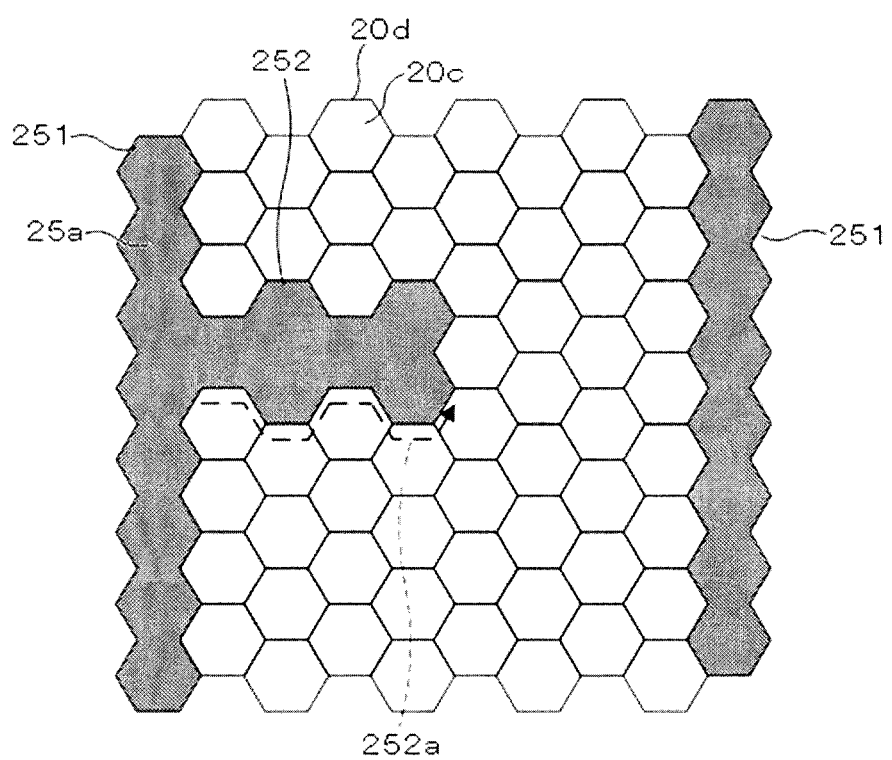
FIG. 7 is an explanatory view showing a fourth aspect of first and second slits in FIG. 3.

FIG. 5 is an explanatory view showing a second aspect of the first and second slits 251, 252 in FIG. 3, and FIG. 6 shows an explanatory view showing a third aspect of the first and second slits 251, 252 in FIG. 3, and FIG. 7 is an explanatory view showing a fourth aspect of the first and second slits 251, 252 in FIG. 3. FIGS. 5 to 7 show an embodiment where each cell 20c has a hexagonal shape. As described above, the extending width 252a of the second slit 252 can be understood as a distance along the partition wall 20d. As shown in FIGS. 5 to 7, when each cell 20c is hexagonal, the extending width 252a of the second slit 252 can be measured as a distance along a polygonal line as shown in each of FIGS. 5 to 7.

Figure 8:
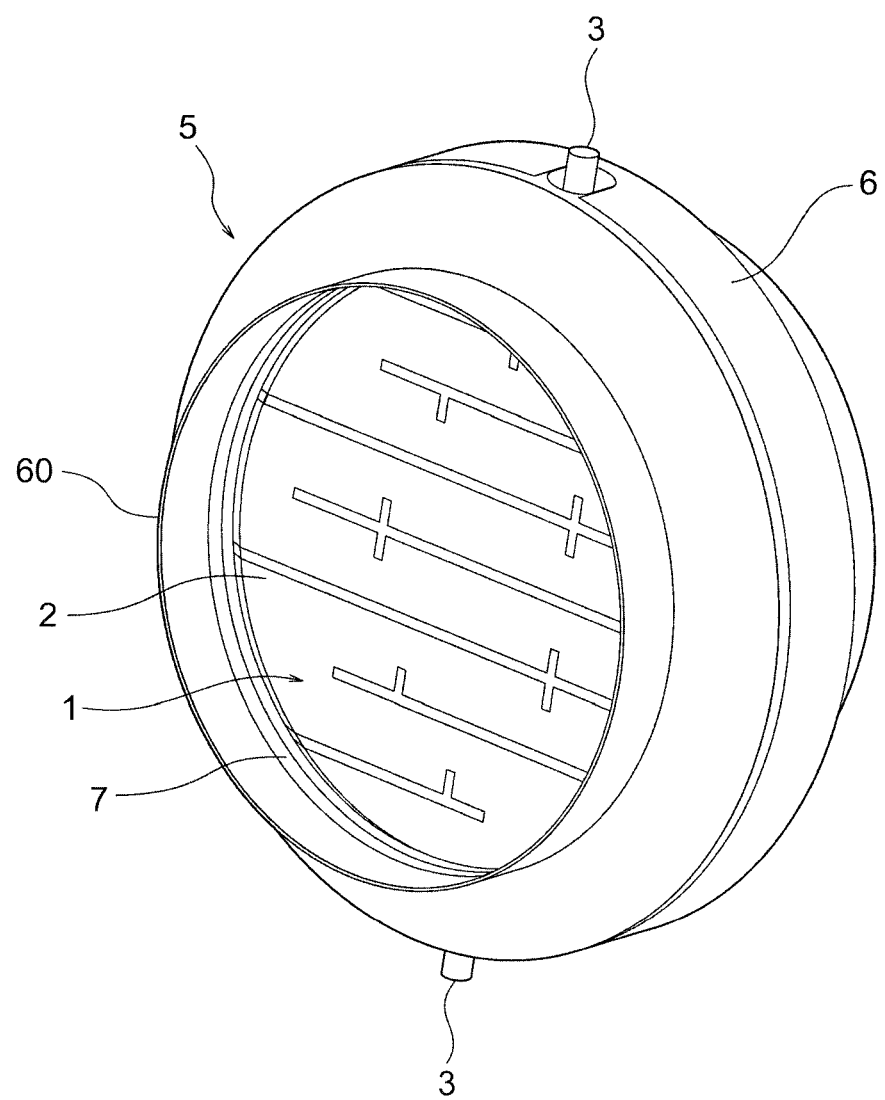
FIG. 8 is a perspective view showing an exhaust gas purifying device including the electrically heated support of FIG. 1.
Figure 9:
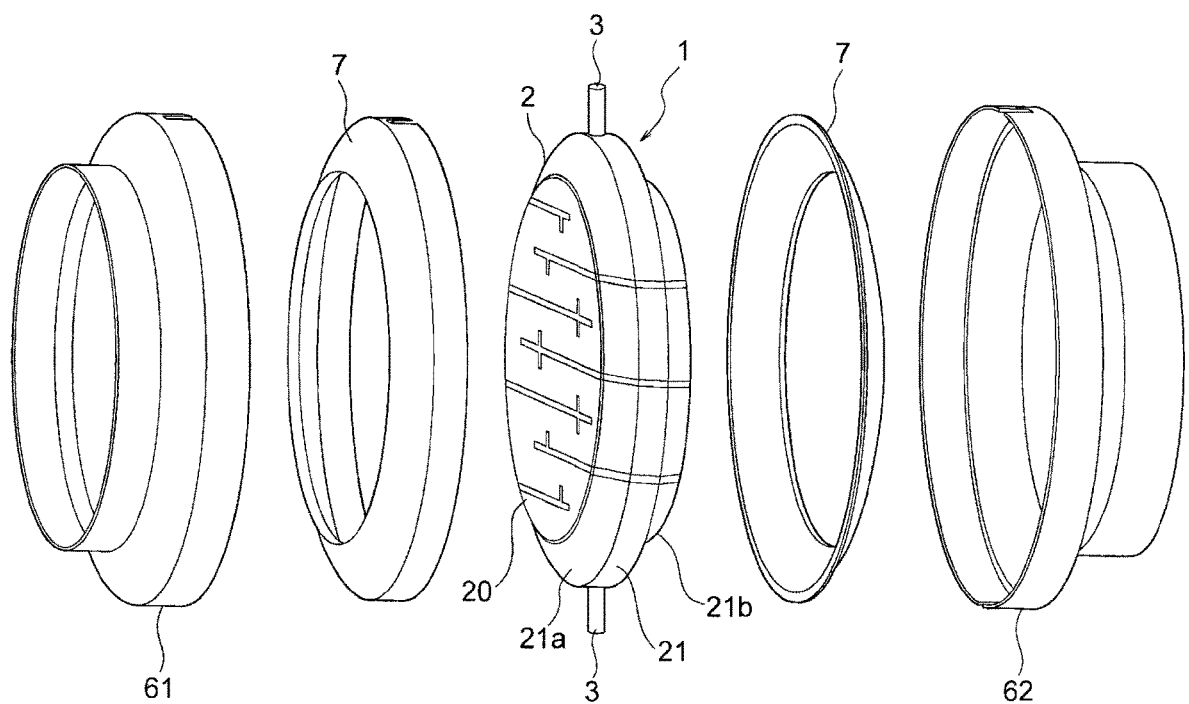
FIG. 9 is an exploded perspective view showing the exhaust gas purifying device of FIG. 8.

FIG. 8 is a perspective view showing an exhaust gas purifying device 5 including the electrically heated support 1 of FIG. 1, and FIG. 9 is an exploded perspective view showing the exhaust gas purifying device 5 of FIG. 8. As shown in FIGS. 8 and 9, the exhaust gas purifying device 5 includes the electrically heated support 1, a metal case 6, and a pair of mats 7.

The metal case 6 is a case for housing the electrically heated support 1. The metal case 6 is provided with an opening 60 for exposing the end faces 20a, 20b of the central portion 20. The metal case 6 is provided so as to cover or hide the outer peripheral portion 21 when the honeycomb structure 2 is viewed along the axial direction of the honeycomb structure 2. The fluid flows into one end faces 20a, 20b of the central portion 20 through the opening 60, and the fluid flows out from the other end faces 20a, 20b. That is, the end faces 20a, 20b of the central portion 20 form end faces for fluid flowing.

As can be particularly seen from FIG. 9, the metal case 6 according to the present embodiment has a pair of case bodies 61, 62. The case bodies 61, 62 sandwich the honeycomb structure 2 from both sides in the axial direction. More particularly, the case bodies 61, 62 grip the honeycomb structure 2 by sandwiching the end faces 21a, 21b of the outer peripheral portion 21. That is, in the electrically heated support 1 according to the present embodiment, the end faces 21a, 21b of the outer peripheral portion 21 form gripping end faces for gripping the honeycomb structure 2.

Each mat 7 is a member interposed between the metal case 6 (case bodies 61, 62) and the honeycomb structure 2. Each mat 7 is made of a material that is more flexible than the metal case 6 such as stainless steel and the honeycomb structure 2. By providing the mat 7, the honeycomb structure 2 can be more reliably held by the metal case 6 (case bodies 61, 62). However, the mat 7 may be omitted.

Figure 10:
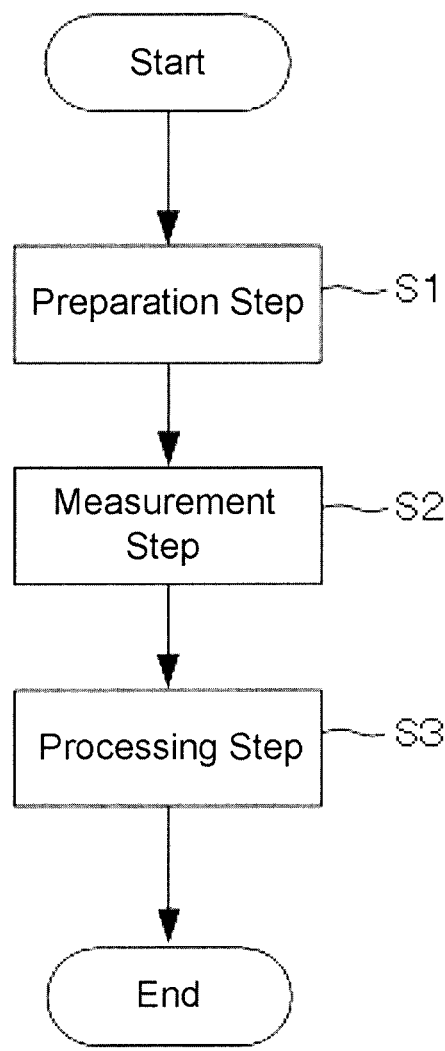
FIG. 10 is a flowchart showing a method for producing the electrically heated support of FIG. 1.

Next, FIG. 10 is a flowchart showing a method for producing the electrically heated support 1 of FIG. 1. As shown in FIG. 10, the method for producing the electrically heated support 1 of FIG. 1 includes a preparation step (step S1), a measurement step (step S2), and a processing step (step S3).

The preparation step (step S1) is a step of preparing the electrically heated support 1 before processing, which has the first slits 251. The electrically heated support 1 before processing can be the electrically heated support 1 having each component except for the second slit 252 as shown in FIG. 1. The preparation step may include a preparation step of preparing a predetermined amount of a material (ceramic green body), a molding step of extruding a material from a mold to obtain a molded body having the outer peripheral wall 22 and the partition wall 20d, an attachment step of attaching electrodes 3 onto the molded body, and a firing step of firing the molded product. The attachment step may be carried out after the firing step. The molded body having the first slits 251 may be obtained during the molding step, or the molded body obtained in the molding step or the fired body obtained in the firing step may be processed to form the first slits 251.

The measurement step (step S2) is a step of energizing the pair of electrode terminals 3 in the electrically heated support 1 before processing, and measuring electric resistance of the energizing path in the electrically heated support 1 before processing. A DC voltage can be applied between the electrode terminals 3. The measurement of electrical resistance can be carried out at room temperature such as 25° C. The measurement can be carried out at a predetermined frequency, for example, for each electrically heated support 1 or for each production lot of the electrically heated support 1. It is understood that the phrase "the measurement can be carried out for each production lot" means that the electric resistance of the energizing path is measured for one or more representative electrically heated supports 1 among a plurality of electrically heated supports 1 made of the same material, obtained in one preparation step, for example.

In the processing step (step S3), the measured value of the electric resistance is compared with a target value of the electric resistance, and based on a difference between the measured value and the target value, the electrically heated support 1 before processing is provided with at least one second slit 252 located in the energizing path in the cross section as described above and extending in a direction different from the first slits 251.

By providing the second slit 252 to the electrically heated support 1 before processing, the electrical resistance of the energizing path can be improved. That is, when the measured value of the electric resistance is lower than the target value, the second slit 252 can be provided to the electrically heated support 1 before processing to obtain electric resistance of the energizing path, which is closer to the target value.

The number, position, and size of the second slit 252 can be changed to adjust an amount of increase in electrical resistance. That is, the number, position, and size of the second slit 252 can be determined depending on the difference between the measured value and the target value of the electric resistance, whereby the electric resistance of the energizing path can be brought close to the target value. As shown in FIG. 1 and the like, at least one second slit 252 may be provided in all the partial paths 26, the second slit 252 may be provided in only a part of the partial paths 26, and the second slit 252 may be provided in a portion between the first slit 251 and the outer peripheral wall 22 of the energizing path.

In particular, the extending width 252a of the second slit 252 in the second direction 2W2 can be changed to easily adjust the electric resistance of the energizing path. Further, the position of the second slit 252 can be determined so as to satisfy predetermined conditions, thereby stabilizing the amount of increase in electrical resistance due to the second slit 252. Therefore, the arrangement pattern (number and position) of the second slit 252 is determined in advance, and the extending width 252a of the second slit 252 is adjusted depending on the difference between the measured value and the target value of the electric resistance, whereby the electrical resistance can be brought closer to the target value more stably and easily. It is understood that by comparing a plurality of electrically heated supports 1 of the same type (same size and/or the same purpose of use), the arrangement patterns of the second slits 252 in those electrically heated supports 1 are determined in advance and the extending width 252a of the second slit 252 is adjusted, whereby the electrical resistance of the energizing path is adjusted.

Figure 11:
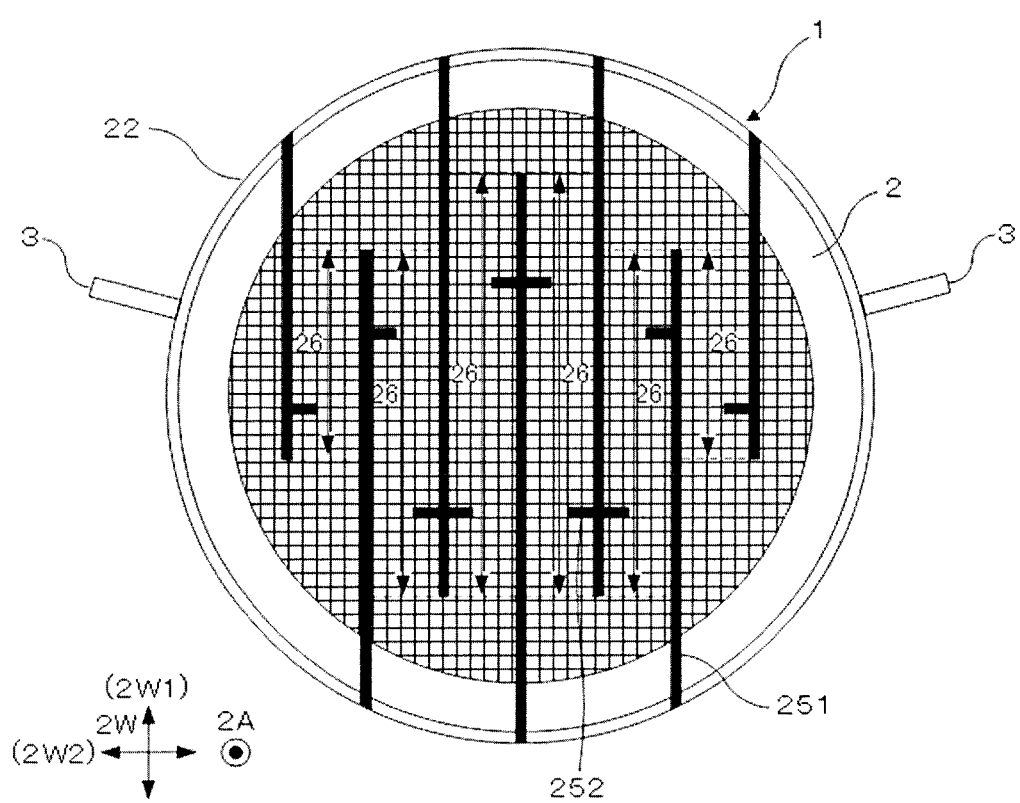
FIG. 11 is a front view showing a first variation of the electrically heated support of FIG. 1.

Next, FIG. 11 is a front view showing a first variation of the electrically heated support 1 of FIG. 1. In the electrically heated support 1 of FIG. 1, the pair of electrode terminals 3 are arranged so as to face each other in the width direction 2W (second direction W2) of the honeycomb structure 2 across the central axis of the honeycomb structure 2, in the cross section perpendicular to the extending direction of the cells 20c. In other words, the pair of electrode terminals 3 were arranged at an angular interval of 180° in the circumferential direction of the honeycomb structure 2. However, the pair of electrode terminals 3 may not necessarily be arranged so as to face each other, and they may be arranged at an angular interval of less than 180° in the circumferential direction of the honeycomb structure 2 as shown in FIG. 11.

Figure 12:
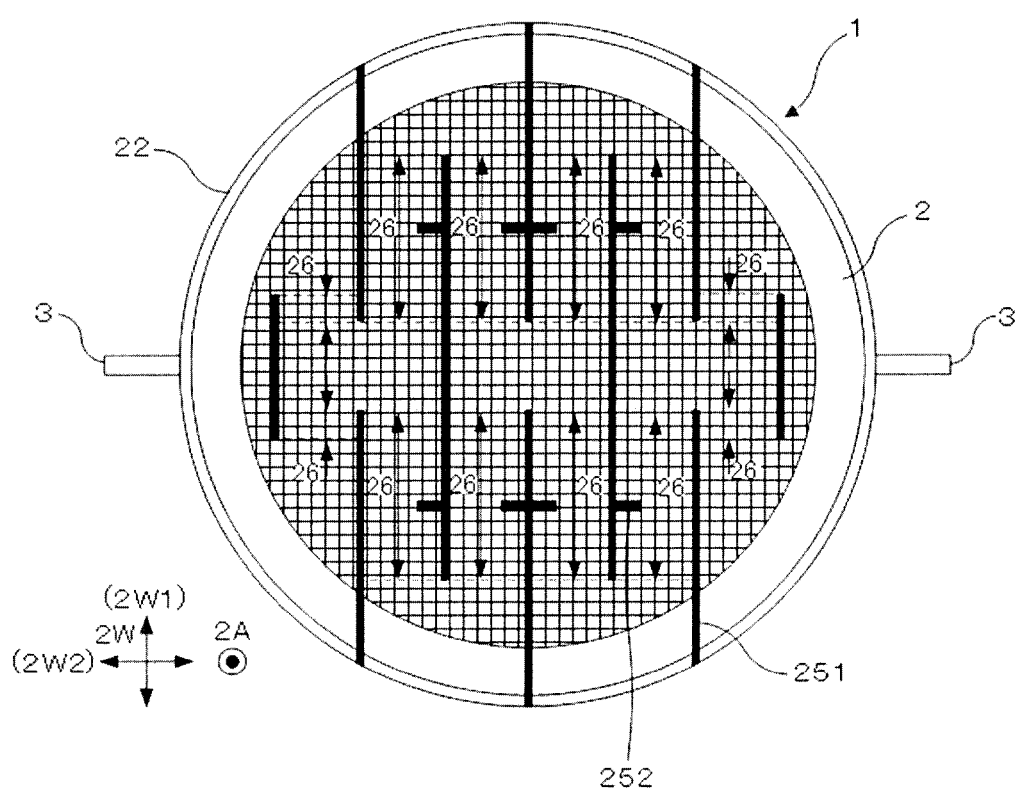
FIG. 12 is a front view showing a second variation of the electrically heated support of FIG. 1.

FIG. 12 is a front view showing a second variation of the electrically heated support 1 of FIG. 1. In the electrically heated support 1 of FIG. 1, all of the first slits 251 extend from the outer peripheral wall 22. However, as shown in FIG. 12, at least a part of the first slits 251 may not extend from the outer peripheral wall 22 (it may be spaced apart from the outer peripheral wall 22). In the second variation as shown in FIG. 12, the first slits 251 spaced apart from the outer peripheral wall 22 and the first slits 251 extending from the outer peripheral wall 22 are alternately arranged in the second direction 2W2. Further, in the second variation, one second slit 252 is provided in a part of the partial paths 26. Each second slit 252 is arranged at the center position of the partial path 26 in the first direction 2W1.

In FIG. 12, the second slit 252 is not provided in the first slit 251 arranged on the outermost side in the second direction 2W2, but the second slit 252 may also be provided in the first slit 251 arranged on the outermost side. In this case, the second slit 252 may be provided at the portion of the energizing path between the first slit 251 and the outer peripheral wall 22, rather than in the partial path 26.

Figure 13:
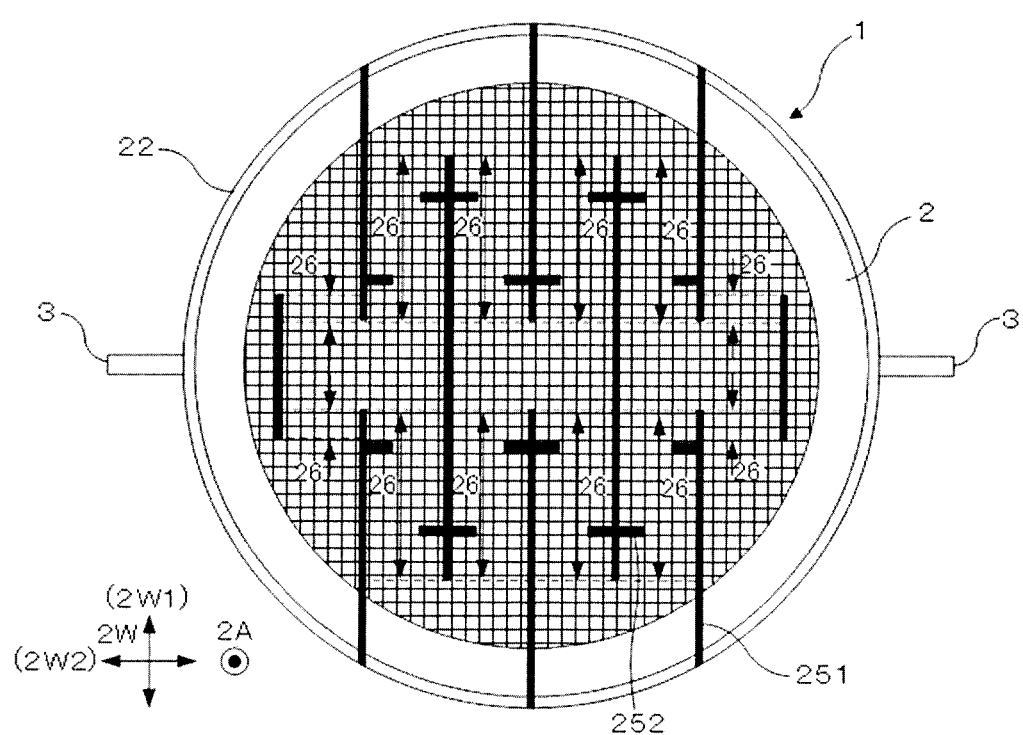
FIG. 13 is a front view showing a third variation of the electrically heated support of FIG. 1.

FIG. 13 is a front view showing a third variation of the electrically heated support 1 of FIG. 1. As shown in FIG. 13, a plurality of second slits 252 may be provided in the partial path 26 even in an embodiment where at least a part of the first slits 251 does not extend from the outer peripheral wall 22. Further, as shown in FIG. 13, in the same embodiment, each second slit 252 may be arranged so as to be displaced from the central position of the partial path 26 in the first direction 2W1.

In the electrically heated support 1 as in the present embodiment, according to the exhaust gas purifying device 5 and the method for producing the electrically heated support 1, the honeycomb structure 2 has at least one second slit 252a in addition to the plurality of first slits 251 configured to define the energizing path, so that a variation in electric resistance between the electrode terminals 3 can be suppressed and the designed output can be more reliably obtained.

Further, first slits 251 extends each linearly in the first direction 2W1 in the cross section as described above, and are spaced apart from each other in the second direction 2W2 orthogonal to the first direction 2W1, and the pair of first slits 251 adjacent to each other in the second direction 2W2 are arranged so as to overlap with each other as viewed from the second direction 2W2. Therefore, the energizing path can be more reliably lengthened.

The extending width 252a of the second slit 252 in the second direction 2W2 is 10% or more and 90% or less of the separation distance 251a in the second direction 2W2 of the pair of first slits 251 across the partial path 26 provided with the second slit 252, so that the electric resistance can be more reliably increased by the second slit 252, and decreases in the strength and/or purification efficiency of the honeycomb structure 2 can be avoided, and the periphery of that second slit 252 forms a heat spot to increase a thermal stress partially, whereby an increased risk of cracking can be suppressed. Further, in the embodiment where the filling material 25a are filled in the second slit 252, an excessive increase in pressure loss can be avoided.

Further, the second slit 252 in the first direction 2W1 in the partial path 26 is located at a position within 30% of the extending width 26b of the partial path 26 in the first direction 2W1 from the central position 26a of the partial path 26 in the first direction 2W1, thereby allowing for stable adjustment of the electric resistance by the second slit 252.

Further, the separation distance 252b between the plurality of second slits 252 in one partial path 26 is 1.25 times or more the separation distance 251a in the second direction 2W2 of the pair of first slits 251 across the one partial path 26, thereby allowing for stable adjustment of the electric resistance by the second slit 252.

Furthermore, at least two partial paths 26 are arranged in series with each other in the energizing path, so that the central portion of the honeycomb structure 2 tends to concentratedly generate heat. The adjustment of the electric resistance by the second slit 252 can provide more uniform heat generation of the honeycomb structure 2. That is, it is particularly useful to provide the second slit 252 in an embodiment where at least two partial paths 26 are arranged in series with each other.

Moreover, at least one of the first and second slits 251, 252 is filled with the filling material 25a, so that the strength of the honeycomb structure 2 can be improved. Further, this can prevent the fluid from flowing to the outer peripheral wall 22 side through the first slits 251 extending from the outer peripheral wall 22, so that deterioration of the electrode terminals 3 and the like can be reduced.

Furthermore, at least a part of the first slits 251 extends from the outer peripheral wall 22, so that the energizing path along the outer peripheral wall 22 does not become the shortest distance, and heat generation on the outer circumference can be suppressed.

Examples

Examples will be now provided. The present inventors defined a circuit model as follows, and calculated electric resistance in the circuit model on the assumption that various second slits 252 were provided in the circuit model. The circuit model was defined as a honeycomb structure having 57 cells 20c in a vertical direction (first direction 2W1) and 10 cells 20c in a horizontal direction (second direction 2W2) as a whole. Each cell 20c is quadrangular. The electric resistance per a partition wall 20d is 0.02510. It is assumed that the cells 20c in each one vertical row on both sides are designated as the first slits 251, and an electric current flows in the region of eight horizontal cells between the first slits 251. For simplicity, it is assumed that the electric current flows evenly throughout the circuit. It is assumed that 4.8 V is applied to the circuit model. In the region of the eight horizontal cells between the first slits 251, a predetermined number of cells 20c in the horizontal row is designated as the second slit 252. When one second slit 252 is provided in the circuit model, the second slit 252 is arranged at the center of the circuit in the vertical direction. When a plurality of second slits 252 are provided in the circuit model, the second slits 252 are arranged in the region separated from both ends of the circuit by 10 cells or more.

Figure 14:
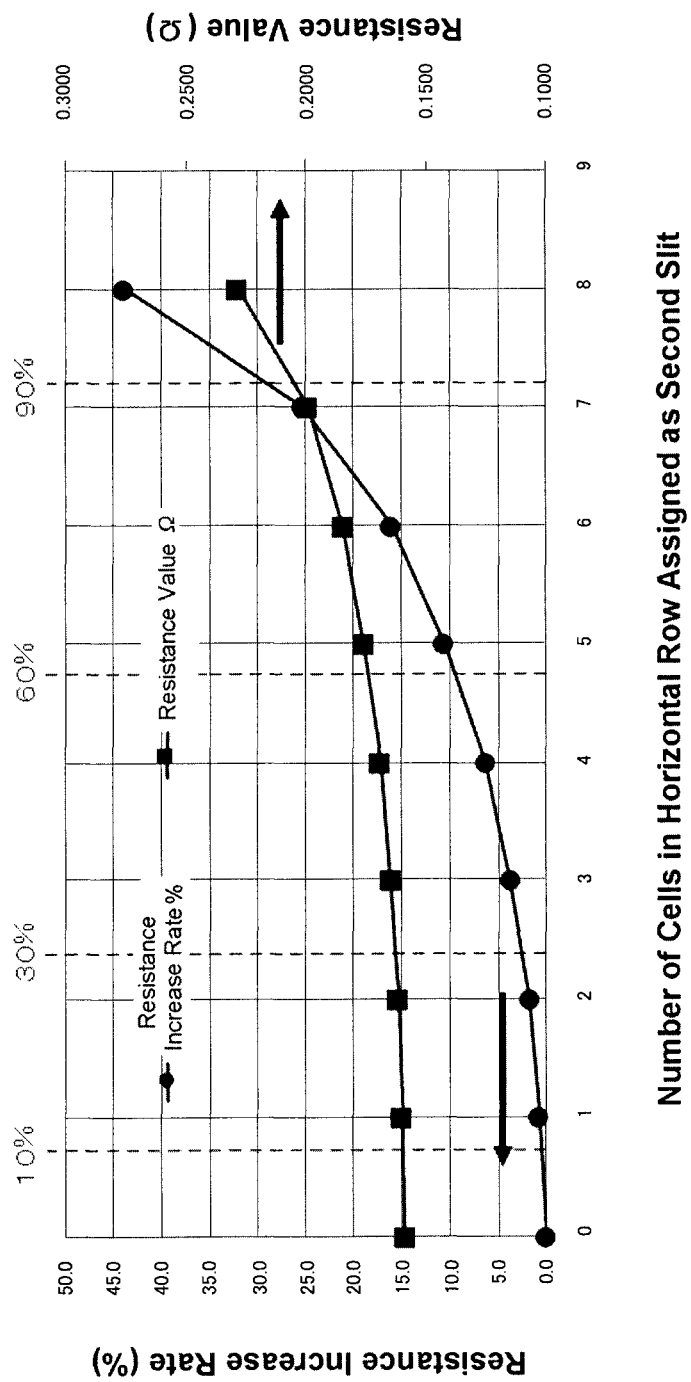
FIG. 14 is a graph showing a relationship between an extending width of a second slit and electrical resistance of an energizing path.

FIG. 14 is a graph showing a relationship between the extending width 252a of the second slit 252 and the electrical resistance of the energizing path. In FIG. 14, the horizontal axis represents the number of cells 20c in the horizontal row designated as the second slit 252 in the circuit model, the right vertical axis represents electrical resistance ($\Omega$), and the left vertical axis represents a rate of increase (%) of electrical resistance from the initial state. Further, the ratio of the extending width 252a of the second slit 252 to the separation distance 251a (8 cells) of the first slits 251 is shown at the upper part of the graph.

As shown in FIG. 14, when the extending width 252a is less than 10% of the separation distance 251a, the electrical resistance due to the second slit 252 does not tend to increase. On the other hand, when the extending width 252a is more than 90% of the separation distance 251a, the resistance value significantly increases. The significant increase in the resistance value causes a heat spot around the second slit 252, and a partial increase in thermal stress increases the risk of the cracking. Further, when the extending width 252a is more than 90% of the separation distance 251a, the strength and/or purification efficiency of the honeycomb structure 2 decreases, and the increase in pressure loss becomes larger. Based on these, it is found that the extending width 252a of the second slit 252 is preferably 10% or more and 90% or less of the separation distance 251a of the first slits 251. Furthermore, in order to further reduce these risks, it is more preferable that the extending width 252a of the second slit 252 is 30% or more and 60% or less of the separation distance 251a of the pair of first slits 251.

Figure 15:
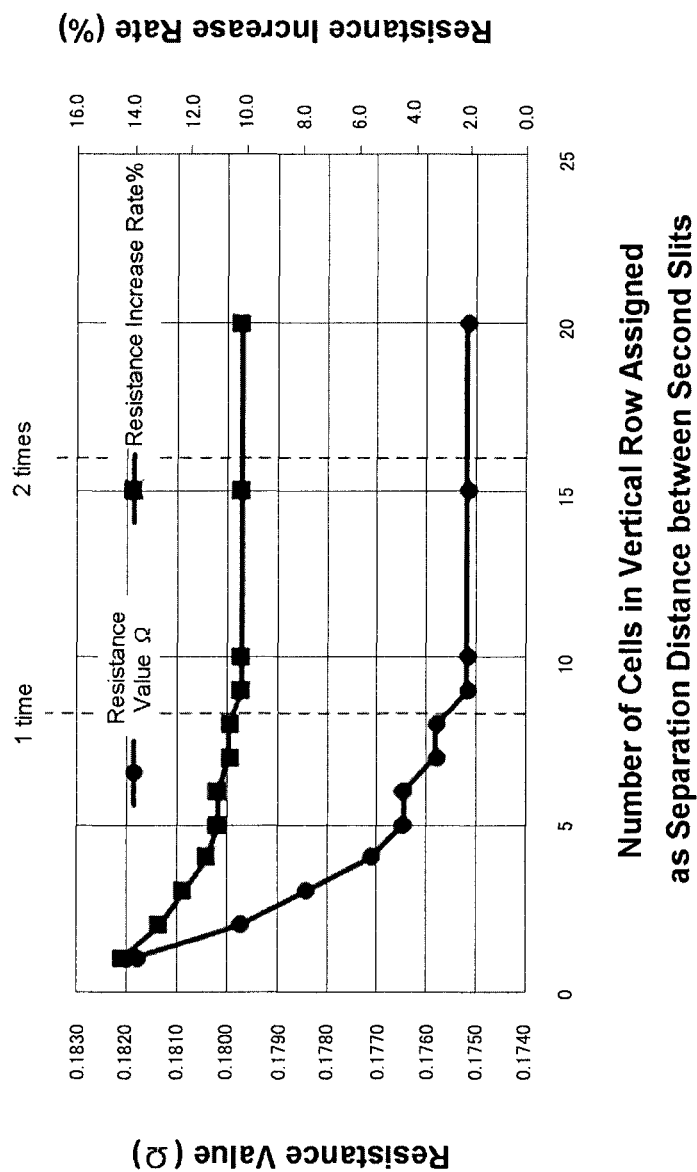
FIG. 15 is a graph showing a relationship between a separation distance between second slits and a separation distance between first slits when a plurality of second slits are provided in one partial path.

Next, FIG. 15 is a graph showing a relationship between electrical resistance and a separation distance 252b between the second slits 252 when a plurality of second slits 252 are provided in one partial path 26. In FIG. 15, the horizontal axis represents the number of cells 20c in the vertical row designated as the separation distance 252b between the second slits 252 in the circuit model, the left vertical axis represents electrical resistance ($\Omega$), and the right vertical axis represents an electrical resistance increase rate (%) from the initial state. Further, a ratio of the separation distance 252b between the second slits 252 to the separation distance 251a (8 cells) of the first slits 251 is shown at the upper part of the graph.

As can be seen from FIG. 15, when the separation distance 252b between the second slits 252 exceeds a certain value, changes in the value of the electric resistance and the rate of increase are decreased as the distance is increased. In particular, it is found that if the separation distance 252b between the second slits 252 is 1.25 times or more the separation distance 251a of the first slits 251, the changes in the value of the electric resistance and the rate of increase are surely decreased, resulting in stable adjustment of the electrical resistance by the second slit 252. Based on this, the separation distance 252b between the second slits 252 is preferably 1.25 times or more, more preferably twice or more, the separation distance 251a of the first slits 251.

Figure 16:
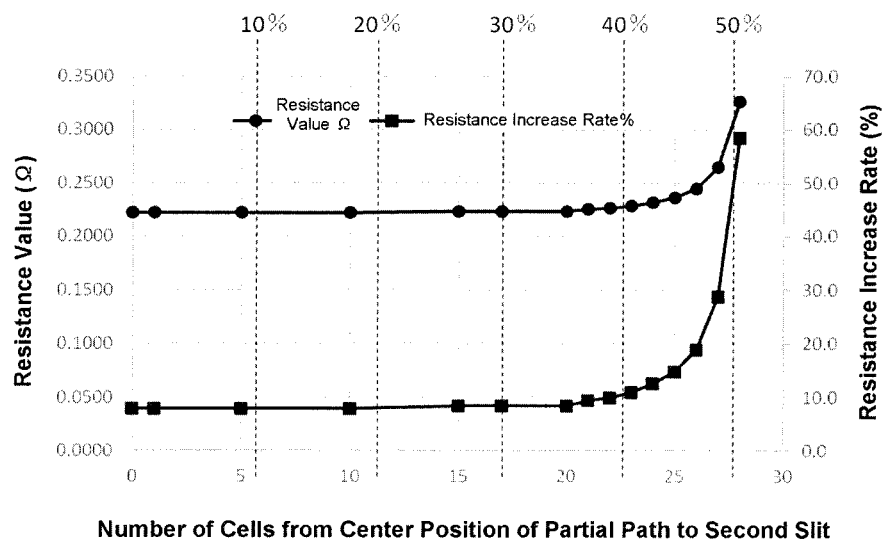
FIG. 16 is a graph showing a relationship between a position of a second slit in a partial path and a center position of the partial path.

Next, FIG. 16 is a graph showing a relationship between the position of the second slit 252 in the partial path 26 and the center position 26a of the partial path 26. In FIG. 16, the horizontal axis represents the number of cells 20c in the vertical direction from the center position 26a of the partial path 26 to the second slit 252 in the circuit model, the left vertical axis represents electrical resistance ($\Omega$), and the right vertical axis represents an electrical resistance increase rate (%) from the initial state. Further, a ratio of the distance (number of cells) from the center position 26a to the second slit 252 to the extending width 26b (57 cells) of the partial path 26 in the vertical direction is shown in the upper part of the graph. The resistance value and the like shown in the graph of FIG. 16 are calculated on the assumption that the electric current flows into the circuit model from the upper end of one first slit 251 and the electric current flows out from the lower end of the other first slit 251.

As shown in FIG. 16, it is found that when the second slit 252 in the vertical direction in the partial path 26 is located at a position within 30% of the extending width of the partial path 26 in the vertical direction from the center position 26a of the partial path 26 in the vertical direction, the changes in the value of the electric resistance and the rate of increase are smaller. Based on this, it is preferable that the second slit 252 is located at a position within 30% of the extending width of the partial path 26 from the central position 26a of the partial path 26.

DESCRIPTION OF REFERENCE NUMERALS 1 electrically heated support
2 honeycomb structure
20c cell
20d partition wall
22 outer peripheral wall
25a filler
26 partial path
251 first slit
252 second slit
3 electrode terminal
5 exhaust gas purifying device
6 metal case

The invention claimed is:

1. An electrically heated support, comprising:
a pillar shaped honeycomb structure, the honeycomb structure comprising an outer peripheral wall and a partition wall disposed inside the outer peripheral wall, the partition wall defining a plurality of cells, each of the cells penetrating from one end face to other end face to form a flow path; and
a pair of electrode terminals provided on a surface of the outer peripheral wall,
wherein, in a cross section of the honeycomb structure perpendicular to a cell extending direction, the honeycomb structure comprises:
a plurality of first slits arranged apart from each other, the first slits being configured to define an energizing path between the outer peripheral wall and each of the first slits and between the first slits; and
a plurality of second slits located in the energizing path, the plurality of second slits extending in a different direction from that of the first slits,
wherein a length of the energizing path from one electrode terminal to the other electrode terminal is longer than a diameter of the honeycomb structure, and
wherein the first slits extend each linearly in a first direction and are arranged apart from each other in a second direction orthogonal to the first direction, in the cross section;
wherein the energizing path is sandwiched between a pair of first slits adjacent to each other in the second direction, and the energizing path comprises a plurality of partial paths extending in the first direction from one end to the other end of the pair of first slits, and the plurality of second slits are provided in the partial paths; and
wherein the position of each of the plurality of second slits in the first direction in the partial path are within 30% of the extending width of the partial path in the first direction from a center position of the partial path in the first direction.

2. The electrically heated support according to claim 1, wherein the second slit intersects with the first slits in the cross section.

3. The electrically heated support according to claim 1, wherein the pair of adjacent first slits are arranged so as to overlap with each other as viewed from the second direction.

4. The electrically heated support according to claim 1, wherein an extending width of the second slit in the second direction is 10% or more and 90% or less of a separation distance of the pair of first slits across the partial path provided with the second slit in the second direction.

5. The electrically heated support according to claim 1, wherein a plurality of the second slits are provided in one partial path so as to be spaced from each other in the first direction, and
wherein a separation distance between the plurality of second slits in the one partial path is 1.25 times or more the separation distance of the pair of first slits across the one partial path in the second direction.

6. The electrically heated support according to claim 1, wherein at least two of the partial paths are arranged in series with each other in the energizing path.

7. The electrically heated support according to claim 1, wherein, in the cross section, the pair of electrode terminals are arranged so as to face each other in the second direction across a central axis of the honeycomb structure.

8. The electrically heated support according to claim 1, wherein at least one of the first and second slits is filled with a filling material.

9. The electrically heated support according to claim 1, wherein at least a part of the first slits extends from the outer peripheral wall.

10. An exhaust gas purifying device, comprising:
the electrically heated support according to claim 1; and
a metal case for housing the electrically heated support.

11. A method for producing electrically heated support according to claim 1,
wherein the method comprises the steps of:
preparing an electrically heated support before processing, which has the first slits;
energizing the pair of electrode terminals and measuring electrical resistance of the energizing path;
comparing the measured value of the electrical resistance with a target value of the electrical resistance, and, based on a difference between the measured value and the target value, providing the electrically heated support before processing with at least one second slit located in the energizing path.

12. The method according to claim 11, wherein the at least one second slit extends in a direction different from that of each of the first slits.

* * * * *